(12) United States Patent
Schenck et al.

(10) Patent No.: US 10,605,631 B2
(45) Date of Patent: Mar. 31, 2020

(54) STRUCTURAL PI JOINT WITH INTEGRATED FIBER OPTIC SENSING

(71) Applicant: Sikorsky Aircraft Corporation, Stratford, CT (US)

(72) Inventors: Eric C. Schenck, Rochester, NY (US); Nathaniel Dew, Milford, CT (US); Andrew M. Brookhart, Wallingford, CT (US); Jonathan K. Garhart, Seymour, CT (US); Cody M. Ture, Fairport, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 148 days.

(21) Appl. No.: 15/668,420

(22) Filed: Aug. 3, 2017

(65) Prior Publication Data
US 2019/0041241 A1 Feb. 7, 2019

(51) Int. Cl.
| | | |
|---|---|---|
| *G01D 5/353* | (2006.01) | |
| *B64D 45/00* | (2006.01) | |
| *B64C 1/12* | (2006.01) | |
| *B64C 1/06* | (2006.01) | |
| *B64C 1/00* | (2006.01) | |

(52) U.S. Cl.
CPC ............. *G01D 5/353* (2013.01); *B64C 1/12* (2013.01); *B64D 45/00* (2013.01); *G01D 5/35374* (2013.01); *B64C 1/061* (2013.01); *B64C 2001/0072* (2013.01); *B64D 2045/0085* (2013.01)

(58) Field of Classification Search
CPC ..................................................... G01D 5/353
See application file for complete search history.

(56) References Cited

U.S. PATENT DOCUMENTS

| | | | | |
|---|---|---|---|---|
| 5,015,842 A | * | 5/1991 | Fradenburgh | G08B 13/126 250/227.15 |
| 5,250,802 A | | 10/1993 | Runner | |
| 5,841,034 A | * | 11/1998 | Ball | G01M 11/086 73/800 |
| 7,393,488 B2 | * | 7/2008 | Grose | B29C 65/527 264/254 |
| 7,669,467 B2 | * | 3/2010 | Breuer | F16B 11/006 73/150 A |
| 8,964,172 B1 | * | 2/2015 | Breiholz | G01M 11/086 250/227.14 |
| 9,017,510 B2 | * | 4/2015 | Hansen | B64C 3/185 156/285 |
| 9,500,561 B2 | | 11/2016 | Sutton et al. | |
| 2001/0030281 A1 | * | 10/2001 | Schulz | G01D 3/165 250/227.21 |
| 2004/0206893 A1 | * | 10/2004 | Sato | G01L 1/242 250/227.14 |
| 2011/0236641 A1 | * | 9/2011 | Brambrink | B29C 65/5057 428/166 |

(Continued)

FOREIGN PATENT DOCUMENTS

WO 2002022440 A1 3/2002

*Primary Examiner* — Sung H Pak (74) *Attorney, Agent, or Firm* — Cantor Colburn LLP (57) ABSTRACT

A structural health monitoring system includes a first component and a second component associated at a joint. At least one sensor is embedded within the joint to monitor a health of at least one of the first component, the second component, and the joint.

17 Claims, 6 Drawing Sheets

(56) References Cited

U.S. PATENT DOCUMENTS

| | | | | |
|---|---|---|---|---|
| 2013/0216770 A1* | 8/2013 | Gilbertson | ............. | B29B 11/16 |
| | | | | 428/121 |
| 2014/0293497 A1* | 10/2014 | Foltz | ........................ | H05F 3/00 |
| | | | | 361/218 |
| 2016/0194071 A1* | 7/2016 | Abe | ....................... | B29C 65/48 |
| | | | | 403/265 |
| 2016/0244140 A1* | 8/2016 | Abe | ..................... | F16B 11/006 |

* cited by examiner

Section A

STRUCTURAL PI JOINT WITH INTEGRATED FIBER OPTIC SENSING

STATEMENT REGARDING FEDERALLY SPONSORED RESEARCH OR DEVELOPMENT

This invention was made with Government support under Technology Investment Agreement No. W911W6-16-2-0001 with the United States Army. The Government has certain rights in the invention.

BACKGROUND

Exemplary embodiments of the disclosure generally relate to an aircraft, and more particularly, to structural health monitoring of an airframe of an aircraft.

Because all structures in use are exposed to repetitive loading, environmental conditions and other external threats, such structures should be monitored for structural integrity and health condition to prolong their life and/or to maintain safety. Numerous systems and methods have been used to identify faults and/or damage of structures, including visual inspection and non-destructive techniques such as eddy current scanning, ultrasonic transmission, acoustic emission, and X-ray inspection. However, these conventional methods require at least temporary removal of structures from service for inspection.

New manufacturing methods are being developed to optimize the assembly of composite based airframe structures with the goal of removing fastened joints. Assembly of composite structures without fasteners improves load transfer efficiency, reduces weight and simplifies manufacturing processes. Among the technical approaches being developed is the use of 3D woven textile structures to serve as joining members in an adhesive interface. One such application is the "pi" joint which has a base that adheres to one member of the joint and a clevis that adheres to the adjoining member.

New diagnostic techniques for in-situ structural health monitoring have been developed. Typically, these new techniques utilize non-embedded, externally mounted sensor systems. However, these new systems have drawbacks, such as susceptibility to sensor system damage, and may not provide effective methods for evaluating structural health. Further, implementing structural health monitoring systems on existing structures can be difficult due to challenges with integration.

There is therefore a need to develop a mechanism for integrating structural monitoring capability into the structural members of a composite airframe so that structural monitoring may be performed without removing the aircraft from active service.

BRIEF DESCRIPTION

According to an embodiment, a structural health monitoring system includes a first component and a second component associated at a joint. At least one sensor is embedded within the joint to monitor a health of at least one of the first component, the second component, and the joint.

In addition to one or more of the features described above, or as an alternative, in further embodiments the sensor includes at least one fiber optic cable.

In addition to one or more of the features described above, or as an alternative, in further embodiments the sensor includes a plurality of fiber optic cables.

In addition to one or more of the features described above, or as an alternative, in further embodiments at least a portion of the plurality of fiber optic cables intersect one another.

In addition to one or more of the features described above, or as an alternative, in further embodiments the joint is defined by a preform.

In addition to one or more of the features described above, or as an alternative, in further embodiments the preform further comprises: a first portion for receiving the first component and a second portion for mounting to the second component, the first portion and the second portion being integrally formed.

In addition to one or more of the features described above, or as an alternative, in further embodiments the first portion extends at an angle to the second portion.

In addition to one or more of the features described above, or as an alternative, in further embodiments the preform includes an opening for receiving at least one of the first component and the second component, the at least one sensor being disposed within the opening.

In addition to one or more of the features described above, or as an alternative, in further embodiments the structural health monitoring system is applied to an aircraft.

In addition to one or more of the features described above, or as an alternative, in further embodiments at least one of the first component and the second component is a skin of the aircraft.

In addition to one or more of the features described above, or as an alternative, in further embodiments at least one of the first component and the second component is a composite panel.

According to another embodiment, an aircraft includes a plurality of panels connected via a plurality of preforms to form a plurality of joints. A structural health monitoring system includes a plurality of sensors associated with the plurality of panels. The structural health monitoring system is operable to monitor a health of the plurality of joints, wherein the plurality of sensors are integrated into the plurality of joints defined by the plurality of preforms.

In addition to one or more of the features described above, or as an alternative, in further embodiments the plurality of sensors is positioned between the plurality of panels of each of the plurality of joints.

In addition to one or more of the features described above, or as an alternative, in further embodiments the plurality of sensors is embedded within the preform defining each of the plurality of joints.

In addition to one or more of the features described above, or as an alternative, in further embodiments the sensor includes at least one fiber optic cable.

In addition to one or more of the features described above, or as an alternative, in further embodiments the sensor includes a plurality of fiber optic cables.

In addition to one or more of the features described above, or as an alternative, in further embodiments the structural health monitoring system includes a controller operably coupled to the plurality of sensors, wherein the controller receives a signal from each of the plurality of sensors to determine a health at each of the plurality of joints.

In addition to one or more of the features described above, or as an alternative, in further embodiments the plurality of preforms are substantially identical.

In addition to one or more of the features described above, or as an alternative, in further embodiments at least one of the plurality of preforms is different from a remainder of the plurality of preforms.

BRIEF DESCRIPTION OF THE DRAWINGS

The subject matter is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Figure 1:
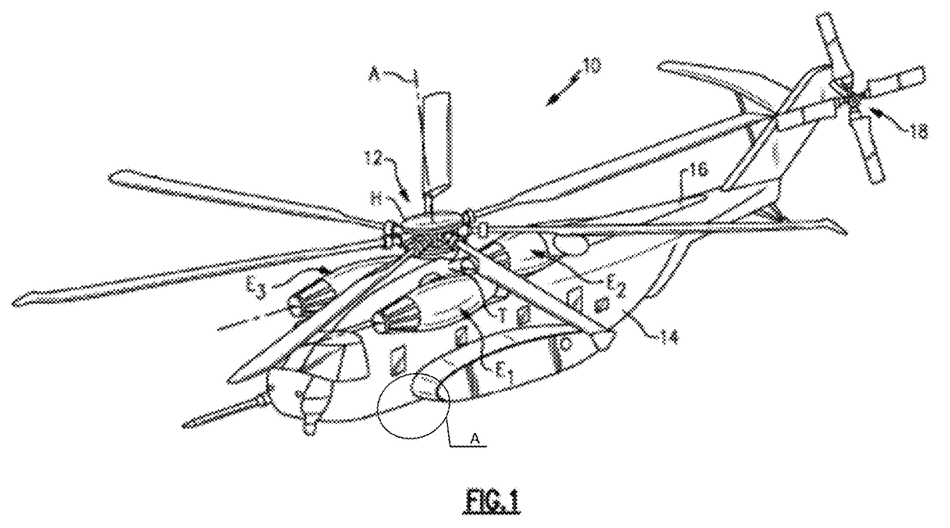
FIG. 1 is a general perspective side view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system, a translational thrust system, a pusher propeller, or a rotor propulsion system for example. Power is transferred from one or more engines E to a power transmission gearbox 20 to drive the main rotor system 12 about a respective axis of rotation A. Although a particular rotary wing aircraft configuration is illustrated and described in the disclosed embodiment, other configurations and/or machines, such as a high speed compound rotary wing aircraft with supplemental translational thrust systems, a dual contra-rotating, coaxial rotor system aircraft, and a turbo-prop, tilt-rotor or tilt-wing aircraft for example, will benefit from the disclosure. In addition, application of the disclosure to fixed wing aircraft, as well as any composite structure requiring maintenance and therefore monitoring, is also contemplated herein.

Figure 2:
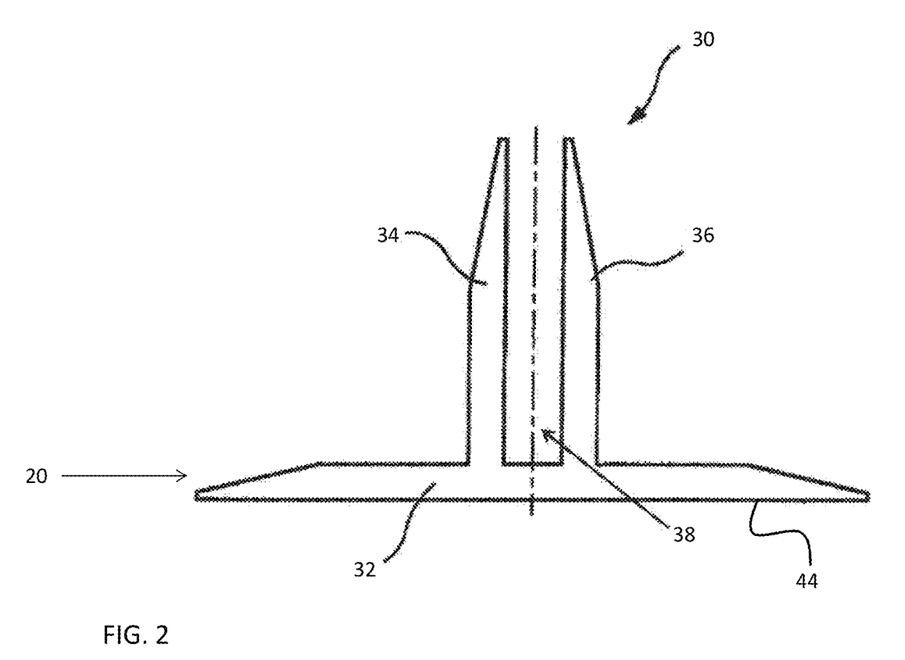
FIG. 2 is a cross-sectional view of an example of a "pi" preform.
Figure 3:
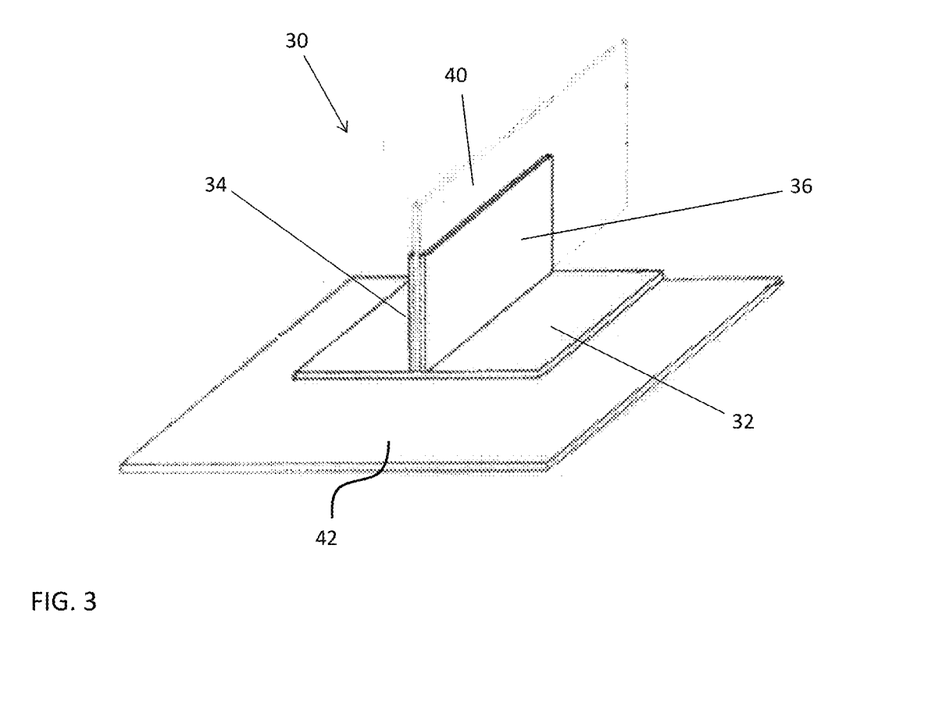
FIG. 3 is a perspective view of the "pi" preform of FIG. 2.

With reference now to FIGS. 2 and 3, an example of a three dimensional preform 30 for forming an adhesive joint between two structural components, such as composite panels of the airframe of an aircraft for example, is illustrated. As shown, the preform 30, also commonly referred to as a pi preform, typically includes a base 32 having first and second upstanding legs 34, 36 extending from a first surface of the base 32. The first and second legs 34, 36 are spaced apart from one another such that an opening 38 is formed there between. In combination, the first leg 34, second leg 36 and opening 38 there between may be referred to herein as a clevis. In the illustrated, non-limiting embodiment, the first leg 34 and the second leg 36 are oriented generally parallel to one another such that the clevis 38 has a substantially uniform width over the length of the legs 34, 36. However, embodiments where the first and second leg 34, 36 are not oriented parallel to one another are also contemplated herein. Further, the first and second legs 34, 36 are shown in an orthogonal configuration, extending generally perpendicular to the base 32. It should be understood that embodiments where the legs 34, 36 are non-perpendicular or angled relative to the base 32 are also within the scope of the disclosure. The preform 30 may be woven by repeating a weave sequence to form adjacent clevis sections along the longitudinal length of the preform. The weave process produces continuous lengths of preform 30, which are then cut to desired lengths for installation. Although a pi preform is illustrated and described herein, any type of composite preform suitable for forming a joint between two structural components is considered within the scope of the disclosure.

When used in the construction of an aircraft, as shown in FIG. 3, a first component or composite panel 40 is positioned within the opening 38, between the first and second legs 34, 36 and a second component or composite panel 42 is coupled to a surface 44 of the base 32. The use of such a preform 30 is effective at transferring loads between the components 40, 42 coupled thereto. In an embodiment, the composite panel 42 coupled to the surface 44 of the base is a skin of the aircraft. For example, as best shown in the detailed view of section A of the aircraft in FIG. 4, a plurality of preforms 30 may be coupled to the skin of the aircraft. As shown, the preforms 30 may be arranged generally parallel to one another and spaced at intervals over one or more dimensions of the aircraft, such as to form a grid-like structure or pattern for example.

Figure 5:
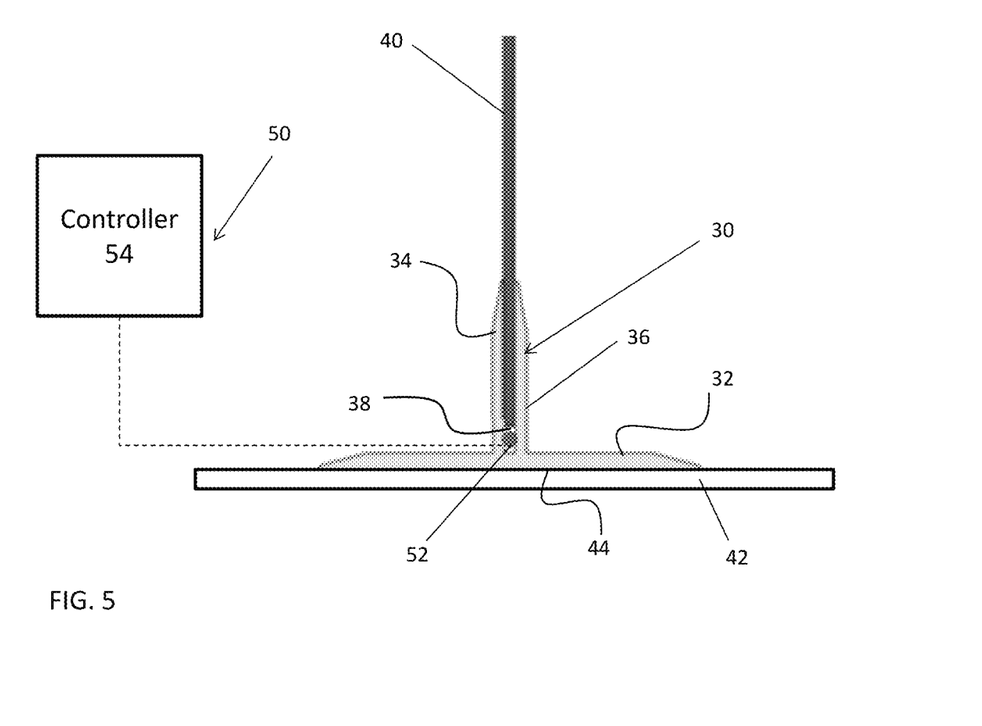
FIG. 5 is a cross-sectional view of a "pi" preform having a structural health monitoring system integrated therewith according to an embodiment.

With reference now to FIG. 5, in an embodiment, a system 50 is used to determine the structural health of a component, a joint, such as formed by the preform 30 for example, or a large airframe sub-assembly by monitoring strain at key locations. Understanding of the integrity and health condition of one or more components is intended to prolong the life of the component and/or prevent catastrophic failure thereof. In an embodiment, the structural health monitoring system 50 is configured to operate in-situ and uses light to measure strain as a result of structural loading. Several methods are used to create fiber optic load sensors, the most common of which is Fiber Bragg Gratings (FBG). The FBG is an optical sensor recorded within the core of a standard, single-mode optical fiber using spatially-varying patterns of intense UV laser light. The grating formed at this modified region of fiber becomes a wavelength selective mirror: light travelling down the fiber is reflected with a specific wavelength unique to the grating at that location. As the FBG is subjected to mechanical strain, the wavelength reflection changes proportionally, resulting in an accurate and repeatable measure of strain at that location. It should be understood that the structural health monitoring system 50 illustrated and described herein is intended as an example only and other in-situ structural health monitoring systems having one or more additional components are also within the scope of the disclosure. Other suitable methods for creating fiber optic load sensors include, but are not limited to, Rayleigh Back Scatter, Continuous Fiber Bragg Gratings, and Fabry-Perot Interferometer.

Figure 4:
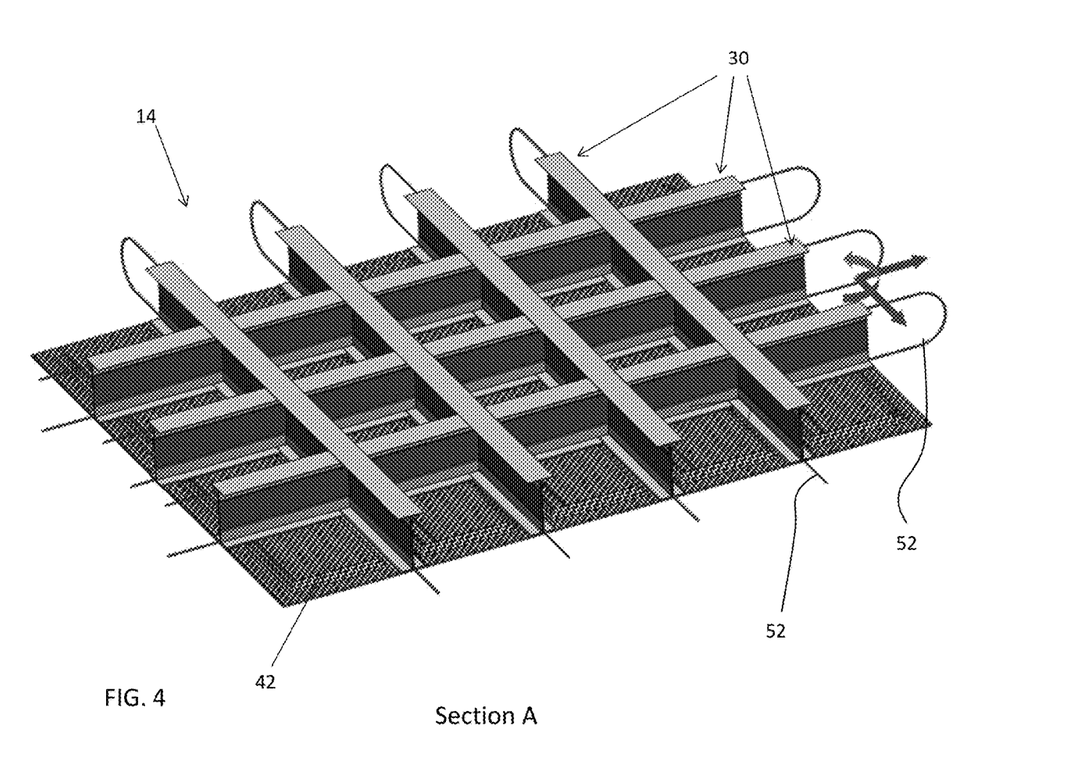
FIG. 4 is a detailed view of section A of FIG. 1 according to an embodiment.
Figure 6:
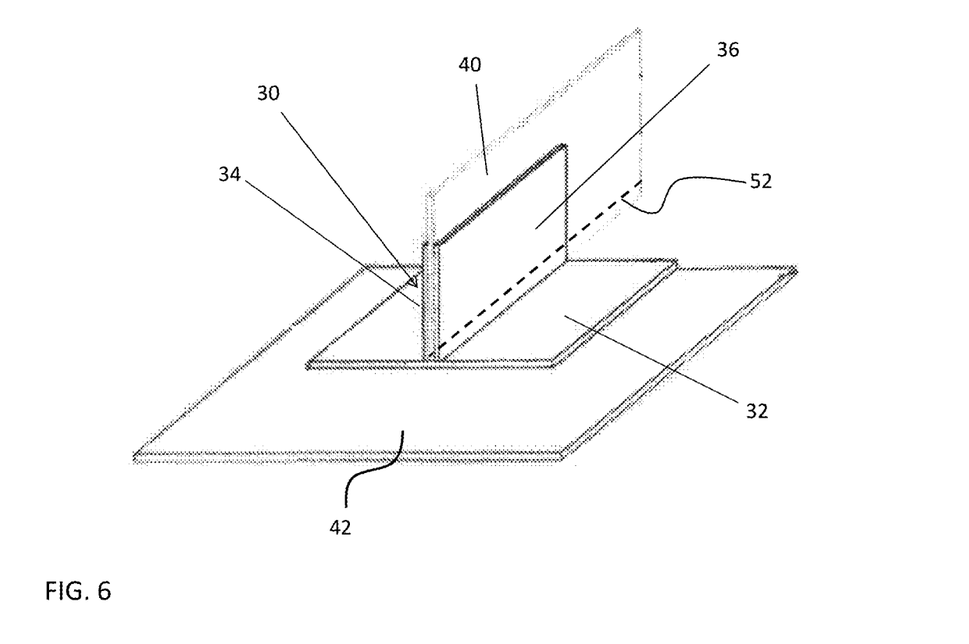
FIG. 6 is a perspective view of a "pi" preform having a structural health monitoring system integrated therewith according to an embodiment.

With reference now to FIGS. 4-6, a structural health monitoring system 50 (see FIG. 5) as described herein may be used to monitor at least one of a first component 40, second component 42, or a joint thereof formed by a preform 30 previously described herein. In such embodiments, a sensor, such as one or more fiber optic cables 52 for example, of the monitoring system 50 are embedded within the preform 30, for example at a position within the opening 38 of the preform 30. As shown, at least one fiber optic cable 52 is receivable within the opening 38 generally between the base 32 and the first component 40. Through this positioning, the one or more fiber optic cables 52 are arranged at the interface between the first and second components 40, 42. In embodiments including a preform having another suitable shape, the one or more fiber optic cables 52 are similarly position at an interface between the plurality of components associated by the preform. Further, when a plurality of preforms are used to monitor a plurality of components, such as all or a portion of the structure of an aircraft, the preforms may be similar, or alternatively, may be different, based on a location of the preform about the aircraft 10. In the illustrated, non-limiting embodiment of FIG. 4, the plurality of fiber optic cables 52 embedded within the plurality of preforms 30 intersect one another to form a grid-like pattern.

The one or more fiber optic cables 52 associated with a preform 30 are arranged in communication with a controller 54, such as the flight control computer of the aircraft for example. The controller is configured to receive a signal from the fiber optic cables 52 and using a stored or accessible algorithm, determine the current health, and in some embodiments the maintenance needs, corresponding to each joint.

Mounting the fiber optic cables 52 or corresponding sensors of a structural health monitoring system within the opening 38 defined by the preform 30 not only easily integrates the system with critical joints, but also positions the sensors or fiber optics within a protected location. As a result, of this positioning, the fiber optic cables 52 are generally protected from damage unless the joint formed by the preform 30 is itself damaged.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. A structural health monitoring system comprising:
    a first component;
    a second component, wherein the second component and the first component are associated at a joint defined by a preform the preform comprising a first leg and a second leg, the first leg and the second leg being spaced apart to create an opening for receiving the first component, and a base arranged between the first component and the second component;
    at least one sensor embedded within the joint to monitor a health of at least one of the first component, the second component, and the joint, wherein the at least one sensor comprises at least one cable arranged in the opening and across a surface of the base.

2. The structural health monitoring system of claim 1, wherein the sensor includes at least one fiber optic cable.

3. The structural health monitoring system of claim 2, wherein the sensor includes a plurality of fiber optic cables.

4. The structural health monitoring system of claim 3, wherein at least a portion of the plurality of fiber optic cables intersect one another.

5. The structural health monitoring system of claim 1, wherein the first leg extends at an angle to the second leg.

6. The structural health monitoring system of claim 1, wherein the first component and the at least one sensor are disposed within the opening.

7. The structural health monitoring system of claim 1, wherein the structural health monitoring system is applied to an aircraft.

8. The structural health monitoring system of claim 7, wherein at least one of the first component and the second component is a skin of the aircraft.

9. The structural health monitoring system of claim 1, wherein at least one of the first component and the second component is a composite panel.

10. An aircraft comprising:
    a plurality of panels, the panels being connected via a plurality of preforms to form a plurality of joints, wherein at least one preform of the plurality of preforms respectively comprises a first leg and a second leg, the first leg and the second leg being spaced apart to create an opening, and a base arranged between a first panel and a second panel of the plurality of panels,
    a structural health monitoring system including a plurality of sensors associated with the plurality of panels, the structural health monitoring system being operable to monitor a health of the plurality of joints, wherein at least one sensor of the plurality of sensors comprises at least one cable arranged in the opening and across a surface of the base of the at least one preform, and wherein the plurality of sensors are integrated into the plurality of joints defined by the plurality of preforms.

11. The aircraft of claim 10, wherein the plurality of sensors is positioned between the plurality of panels of each of the plurality of joints.

12. The aircraft of claim 10, wherein the plurality of sensors is embedded within the preform defining each of the plurality of joints.

13. The aircraft of claim 10, wherein the sensor includes at least one fiber optic cable.

14. The aircraft of claim 13, wherein the sensor includes a plurality of fiber optic cables.

15. The aircraft of claim 10, wherein the structural health monitoring system includes a controller operably coupled to the plurality of sensors, wherein the controller receives a signal from each of the plurality of sensors to determine a health at each of the plurality of joints.

16. The aircraft of claim 10, wherein the plurality of preforms are substantially identical.

17. The aircraft of claim 10, wherein at least one of the plurality of preforms is different from a remainder of the plurality of preforms.

* * * * *